Figure 2:
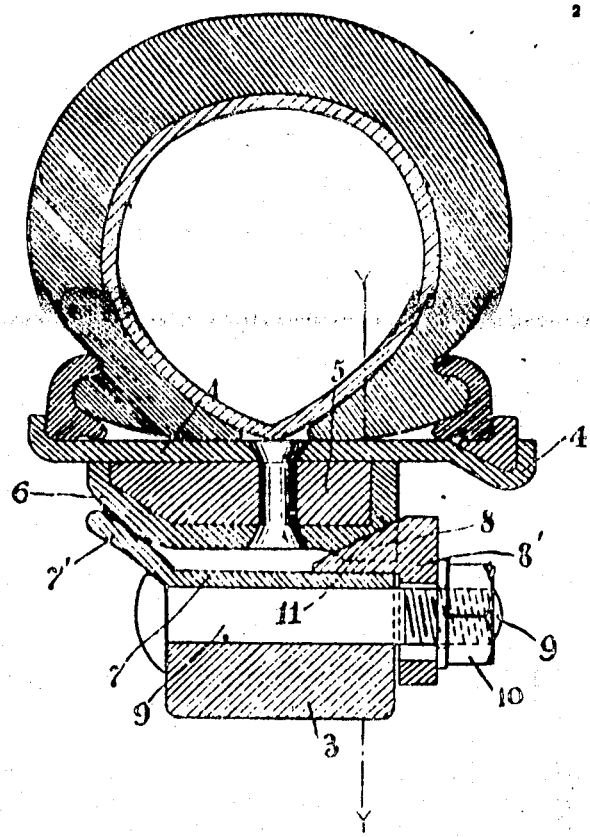

UNITED STATES PATENT OFFICE.

RAYMOND HEALY, OF BROOKLYN, NEW YORK.

DEMOUNTABLE WHEEL-RIM.

975,767. Specification of Letters Patent. Patented Nov. 15, 1910.
Application filed April 1, 1909. Serial No. 490,559.

*To all whom it may concern:*

Be it known that I, RAYMOND HEALY, a citizen of the United States, and a resident of Brooklyn, in the county of Kings and State of New York, have invented certain new and useful Improvements in Demountable Wheel-Rims, of which the following is a specification.

My present invention relates to vehicle wheels and more particularly to such wheels in which a tire holding rim is demountably secured to the wheel proper whereby the rim can be removed from the wheel without first removing the tire from the rim.

One of the objects of my invention is to provide a construction whereby rims which do not present any curved or inclined surface adapted to be engaged by clamps may be demountably secured to the wheel in a strong and safe manner.

Other objects of my invention are lightness and cheapness of construction and to provide a construction which can be used with any type of tire holding rim whatever.

Heretofore it has been impossible to employ a demountable rim in such cases where the periphery of the rim was straight and did not present any curved surface to be engaged by the clamping means and wherein the clamping devices held the rim mainly by a frictional or expansible force. It has therefore been proposed to make these rims of special form to meet the demands for a demountable rim, which special rims are expensive to construct as new rolls are required to form them and they therefore have been impractical.

While my invention is designed primarily so that it can be carried out with a cylindrical rim it will be understood that other forms of rims might equally well be employed and that wherein the term "rim" is used in the subjoined description and claims, any form of rim is meant, whether presenting a cylindrical or other surface.

Also heretofore great trouble has been experienced in applying demountable rims to standard wheels. For an example, suppose it is desired to equip an automobile wheel with a demountable rim which has heretofore been provided with a fixed rim only. The fixed rim is removed and it is then necessary to cut or turn down the felly to a varying amount to allow for the liners, clamps &c. used with a demountable rim. As wheelwrights well know this is a difficult task and one that is uncertain in good results. By practicing my invention this cutting down of the old felly is dispensed with as when it is desired to have a demountable rim of a given size, a standard wheel of the next smaller sized felly is employed and a supplementary felly is secured to the rim which takes up the space between the fixed wheel felly and the demountable rim. For instance, if it is desired to have a 34 x 4 in. wheel, which means a 34 x 4 in. rim must be employed, a wheel 32 x 4 in. is used and a felly secured to the inner periphery of the rim and movable with it is used to take up the space between the 32 x 4 wheel and the 34 x 4 rim.

My invention consists in the novel arrangements of parts and details of construction hereinafter more particularly described and then specified in the claims.

Figure 3:
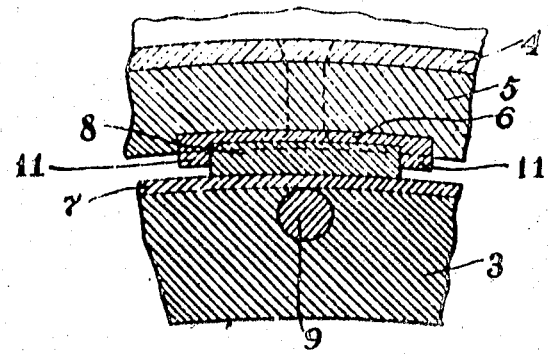

In the accompanying drawings Figure 1 illustrates, in side elevation, a vehicle wheel having my invention applied thereto. Fig. 2 is an enlarged transverse section on the line *x x* Fig. 1. Fig. 3 is a section on the line Y Y of Fig. 2 and shows the manner of obtaining a positive drive in both directions between the wheel and the demountable rim.

In carrying out my invention a standard wheel with fixed felly is employed, but the felly of the wheel is preferably the next smaller size in diameter than the size of rim desired. The hub of the wheel, indicated at 1, is provided with spokes 2 and a felly 3 fixed to the end of the spokes as is usual in the art.

4 indicates a rim adapted to hold a pneumatic tire and which might be of any shape or design. The rim herein shown is what is known as a rim for a quick detachable tire and one which it has heretofore been practically impossible to employ as a demountable rim as it does not present any surface to be engaged by the detachable clamping means. I secure to the inner periphery of the rim a wooden felly 5 concentric with the wheel felly 3 and which encircles said wheel felly. This supplementary felly 5 is provided with a plurality of metallic attachments or bands 6 located at intervals around its circumference. The attachments 6 are preferably countersunk into the felly 5 so that their outer surfaces will be flush with the periphery of the felly 5.

7 indicates a circumferential liner or band shrunk or otherwise secured on the outer periphery of the wheel felly 3. The band 7 is provided at one side with an outwardly projecting flange 7' against which one side of the rim felly 5 seats when the rim is applied to the wheel, the other edge of the band terminating flush with the opposite side of the wheel felly 5.

At the side of the felly opposite the flange 7' are located the clamps for securing the rim 4 and felly 5 to the wheel, which clamps might be of any suitable or desirable construction. Preferably the clamps are in the form of wedges 8 equal in number and location to the attachments 6 and enter between said attachments and the band 7, the wedges having a flat seat upon the liner or band 7 and an inclined bearing on the attachments 6 whereby as the wedges 8 are forced inward the rim 4 and felly 5 will be expanded and securely held to the wheel or wheel felly 3.

9 indicates bolts passing transversely through the felly 3 and loosely through a slot in a depending lip 8' secured to the wedges 8. A nut 10 threaded on the end of the bolt forces the wedge 8 inward by acting on the lip 8' thereof in an obvious manner.

Preferably the attachments 6 are provided with projecting lugs 11 on either side of the inclined surface upon which the wedge 8 bears. The wedges 8 are so formed as to engage the attachment 6 between the lugs 11 and so that the sides of the wedges will have a bearing on the sides of the lugs whereby any slip is prevented between the fixed felly 3 and the supplementary or demountable felly 5, thus obtaining a positive drive in both directions.

What I claim as my invention is:

1. In a device of the character described, the combination with a wheel, a felly fixed to said wheel, a demountable tire-holding rim, a felly fixed to said rim, a plurality of transverse metallic bands fixed to said rim felly provided with surfaces at each side inclined to the inner periphery of the felly and clamping means secured to said wheel felly and adapted to engage the inclined surfaces of said transverse bands.

2. In a device of the character described, the combination with a wheel, a felly fixed to said wheel, a demountable tire-holding rim, a felly fixed to said rim, a plurality of transverse metallic bands fixed to said rim and provided with surfaces inclined to the inner periphery of the felly and located opposite said wheel felly, means secured to said wheel felly and adapted to engage said rim felly at one side and a plurality of wedges secured to said wheel felly and adapted to be inserted between said fellies on the opposite side and to engage an inclined surface of said bands.

3. In a device of the character described, the combination with a wheel, a felly fixed to said wheel, a demountable tire-holding rim, a felly fixed to said rim, a plurality of transverse metallic bands fixed to said rim felly and provided with surfaces inclined to the inner periphery of the felly, lugs secured to said bands on both sides of one of said inclined surfaces, means secured to the wheel felly and adapted to engage the inclined surface at one side of said rim felly and clamps secured to said wheel felly and adapted to engage the other inclined surface of said bands, between and in engagement with said lugs.

Signed at New York in the county of New York and State of New York this 16th day of April A. D. 1909.

RAYMOND HEALY.

Witnesses:
 IRENE LEFKOWITZ,
 EDWARD M. JELLINEK.